(No Model.)
J. CORELL.
STEAM TRAP.
No. 413,494. Patented Oct. 22, 1889.
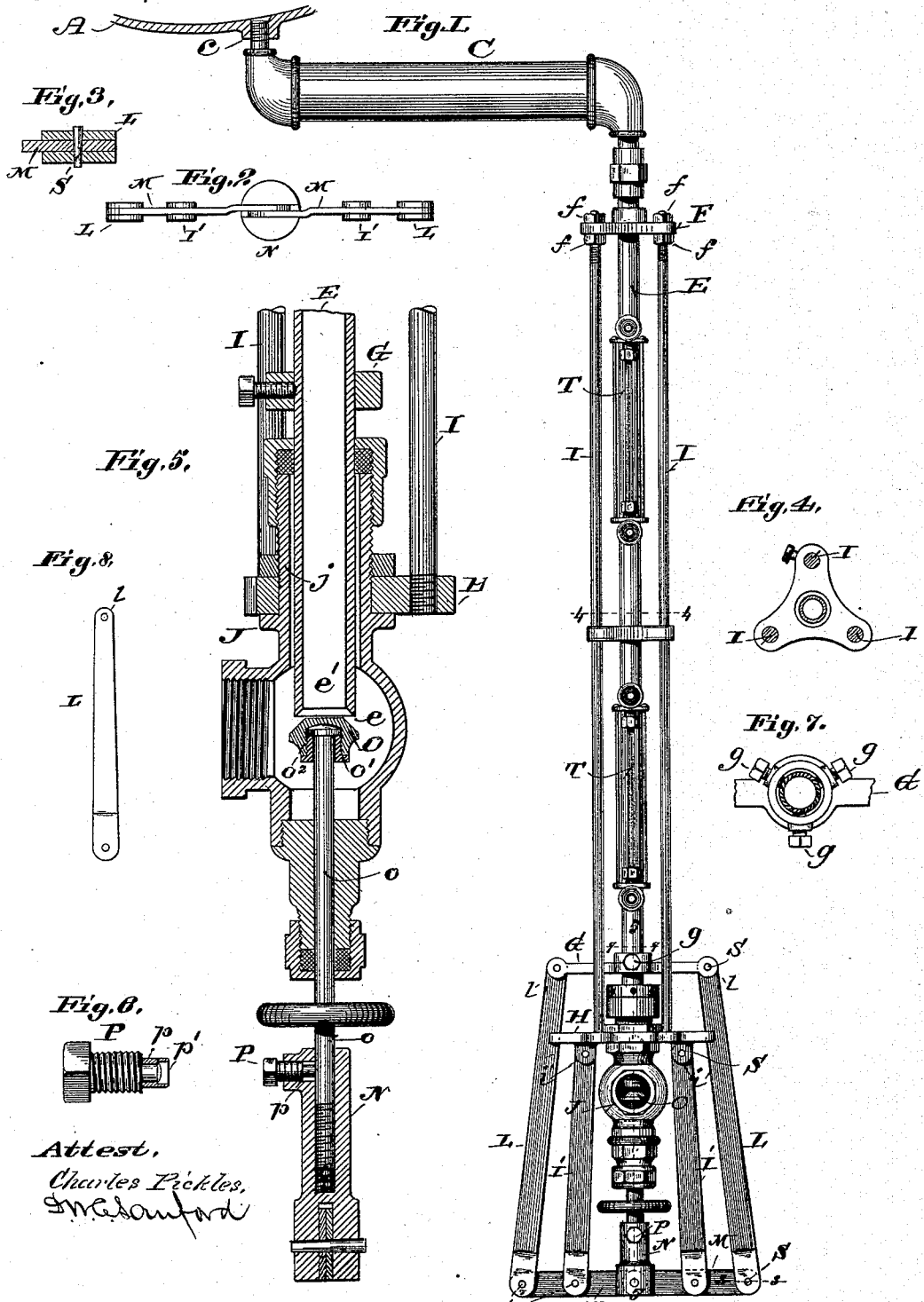
Attest,
Charles Pickles
J. W. C. Sanford
Inventor:
John Corell
by C. D. Moody, atty

UNITED STATES PATENT OFFICE.

JOHN CORELL, OF BROOKLYN, NEW YORK.

STEAM-TRAP.

SPECIFICATION forming part of Letters Patent No. 413,494, dated October 22, 1889.

Application filed January 12, 1889. Serial No. 296,151. (No model.)

*To all whom it may concern:*

Be it known that I, JOHN CORELL, formerly of St. Louis, Missouri, and now of Brooklyn, New York, have made a new and useful Improvement in Steam-Traps, of which the following is a full, clear, and exact description.

This improvement relates to the construction described in Letters Patent of the United States No. 332,997, granted to me December 22, 1885, for an improvement in steam-traps; and it consists more especially in the features all substantially as hereinafter set forth and claimed, aided by the annexed drawings, making part of this specification, in which—

Figure 1 is a side elevation of the improved trap in position; Fig. 2, a view of the lower or outer end of the trap; Fig. 3, a section on the line 3 3 of Fig. 1; Fig. 4, a cross-section on the line 4 4 of Fig. 1; Fig. 5, a central longitudinal section on the line 5 5 of Fig. 1; Fig. 6, a side elevation, partly in section, of the device used in clamping the valve-stem in its holder; Fig. 7, a cross-section on the line 7 7 of Fig. 1, and Fig. 8 a detail.

The views are upon various scales, and the same letters of reference denote the same parts.

A represents any apparatus with which a steam-trap of the kind under consideration is adapted to be used. The pipe through which the steam is supplied to the apparatus is not shown.

C represents the pipe through which the steam and condensed water pass from the apparatus to the trap. Instead of making this pipe, as heretofore, of substantially the same diameter as that of the outlet *c* from the apparatus, or as that of the steam-tube E of the trap, it is made of a considerably larger diameter, substantially as shown, by which means is obtained what may be termed a "vacuum-chamber," into which the steam flows and condenses sufficiently to form a vacuum and thereby cause the discharge of the condensed water from the apparatus A into the pipe C to be facilitated. The pipe, or rather chamber, C, however, serves an additional purpose—namely, as a receptacle for the condensed water in the event the trap cannot work it off with sufficient rapidity.

E represents the steam-tube of the trap. Its upper end is connected with the chamber C, and its lower end *e'*, Fig. 5, works through the stuffing-box *j* of the valve-chamber J. It is desirable that the steam-tube be held centrally within the stuffing-box, and to this end the rods I I I, which lead from the cross-plate F, Fig. 1, past the cross-plate G, to the cross-plate H, are arranged equally distant from each other and equally distant from the steam-tube, as shown in Fig. 4. The cross-plate F is fastened to the tube E at the upper end thereof, as before. The cross-plate G is fastened to the tube E, toward the lower end thereof, and the valve-chamber J is fastened to the cross-plate H; but in the original construction the rods I I I are not relatively arranged as they are in the present construction, and in consequence the rods in the original construction are liable to be expanded unequally, and when thus unequally expanded the lower end of the steam-tube and the surrounding stuffing-box become relatively inclined. This difficulty is obviated by arranging the rods I I I as herein shown.

To enable the position of the water to be readily determined, and also to be able to judge of the manner in which the water is working through the trap, gages (one or more) are applied to the tube E, substantially as shown in Fig. 1. The upper gage T may be fixed opposite that part of the tube E above which it is undesirable for the water to stand. By observing the motion of the water through the gage and its position therein the operator is enabled to adjust the valve O with relation to its seat so that it shall operate to the best advantage. It is also desirable to keep the valve-stem holder N centrally in line with the valve-seat *e*. To this end, and in the place of employing but a single set-screw *g* to secure the upper cross-plate G to the tube, as in the original construction, I now employ three set-screws *g g g*, arranged equidistant from each other, as is shown in Fig. 7. This causes the tube E to remain in the center of the cross-plate G and the holder N to be adjusted accordingly.

The tube E is shortened with every grinding of the valve; but to enable the position of the valve-seat to be preserved the rods I I I are threaded, and nuts *f f* are applied thereto and respectively above and beneath the plate F. By suitably operating the nuts the rods may be shortened and the rods and tube relatively adjusted so as to cause the relation of the valve to the valve-seat to be maintained.

The valve O, instead of being attached rigidly to its stem o, is connected therewith as shown in Fig. 5—namely, by passing the valve onto the stem and screwing the valve to a nut o', which loosely encircles the stem and at its upper end bears against a shoulder $o^2$ upon the upper end of the stem. The top of the stem is rounded, and the valve is fitted to be turned thereon and thus be made to accommodate itself to the valve-seat e.

In the original construction the screw P, used to secure the valve-stem o in the valve-stem holder N, does not bear directly against the valve-stem, but against a plate, which in turn bears against the valve-stem. The plate referred to was a piece separate from the screw, and it in use was liable to be lost. To obviate this difficulty, I now make the part in the form of a thimble p, Figs. 5 and 6, which encircles loosely an extension p' of the screw, and which is held upon said extension by riveting it thereto, as shown. The part p is thus secured to the screw, but so that the screw can be turned around within it as the screw is screwed into the holder to cause the thimble p to bind the valve-stem.

In the original construction it is a tedious matter to open the arms L L, also the arms I' I', apart from each other whenever it is desired to get at the valve. The difficulty is overcome by rounding the arms L at the ends l and the arms I' I' at the ends i', whereby the arms, after the levers M M are detached from the holder N and the cross-plate G loosened on the tube E, can be turned upon the cross-plates G H, respectively, and the cross-plate G raised on the tube E, and the valve and valve-seat made accessible.

S, Figs. 3 and 1, represents a tapered pin used in forming the various joints of the device. When it has become worn, it is turned a quarter-turn around, and when all four sides of it are worn the perforations in the arms, &c., which receive the pin can be reamed out and the pin driven slightly farther in.

I claim—

The combination, with the apparatus A and steam-tube E, of the horizontal tubular chamber C, of considerably greater diameter than the steam-tube and than the discharge-opening into it from the said apparatus, substantially as specified.

Witness my hand this 27th day of December, 1888.

JOHN CORELL.

Witnesses:
C. D. MOODY,
D. W. C. SANFORD.